United States Patent [19]
Lee

[11] 3,914,203
[45] Oct. 21, 1975

[54] OIL-SOLUBLE REACTION PRODUCTS OF (A) A HIGH MOLECULAR WEIGHT OLEFIN POLYMER, ACRYLONITRILE, CHLORINE, AN AMINE AND MALEIC ANHYDRIDE WITH (B) AN ALIPHATIC AMINE; AND LUBRICANT COMPOSITIONS CONTAINING THE SAME

[75] Inventor: Richard J. Lee, Downers Grove, Ill.

[73] Assignee: Standard Oil Company, Chicago, Ill.

[22] Filed: June 10, 1974

[21] Appl. No.: 477,667

[52] U.S. Cl........ 260/78.4 D; 260/878; 252/51.5 A
[51] Int. Cl.² ........................................... C08F 3/02
[58] Field of Search................ 260/78.4 D, 878 R

[56] References Cited
UNITED STATES PATENTS

| | | | |
|---|---|---|---|
| 2,825,723 | 3/1958 | Leverkuson | 260/94.9 |
| 3,579,486 | 5/1971 | McConnell | 260/78.4 D |
| 3,778,418 | 12/1973 | Nakayama | 260/78.4 D |

*Primary Examiner*—William F. Hamrock
*Attorney, Agent, or Firm*—Fred R. Ahlers; Arthur G. Gilkes; William T. McClain

[57] ABSTRACT

Oil-soluble products, suitable as dispersant additives for lubricants, are obtained by reacting (a) a high molecular weight olefin polymer, having an average molecular weight of at least about 600, with acrylonitrile, a halogen, e.g., chlorine, in the presence of a catalyst, e.g., iodine, (b) reacting the product of (a) with a primary aliphatic amine, (c) reacting the resultant product of (b) with maleic anhydride, and (d) reacting the product resulting from (c) with an aliphatic amine or polyamine containing at least one primary amino group per anhydride function on the product (c).

8 Claims, No Drawings

OIL-SOLUBLE REACTION PRODUCTS OF (A) A HIGH MOLECULAR WEIGHT OLEFIN POLYMER, ACRYLONITRILE, CHLORINE, AN AMINE AND MALEIC ANHYDRIDE WITH (B) AN ALIPHATIC AMINE; AND LUBRICANT COMPOSITIONS CONTAINING THE SAME

BACKGROUND OF THE INVENTION

Lubricant deterioration in high speed engines causes the formation of lacquer, and sludge, and carbon deposits on the interior surfaces of the engines, which accelerates wear and reduces engine efficiency. To reduce the tendency for such deleterious products to deposit on the surfaces of the engines, it is known to incorporate in the lubricating oil certain additives having dispersancy and/or detergency properties.

The continuing search for and the necessity of having available ashless dispersant and/or detergent additives for motor oils is well known. Since the development of positive crankcase ventilation systems (PCV) there is a greater demand for improved additives of such types.

Various products have been developed for the purpose of imparting dispersant and/or detergent properties to lubricating oils: such as, by way of example, neutral and over-based metallo-organic compounds such as alkaline salts of sulfonic acids, and of hydrocarbon-$P_2S_5$ reaction products. In-service drawbacks of such additives include the formation of undesirable metal-ash thermal decomposition products. Other addition agents were amine salts, amides, and amides of polybutenyl-substituted polycarboxylic acids. Still other proposed additives were combinations of alkaline earth sulfonates and Mannich condensation products of alkyl-substituted hydroxyaromatic compounds, amines having at least one replaceable hydrogen on a nitrogen atom, and aldehydes; alkaline earth salts of such Mannich condensation products have also been proposed.

SUMMARY OF THE INVENTION

In accordance with the present invention, the herein-described products, useful as lubricant additives, are obtained by the process comprising (a) reacting, at a temperature of from about 60°F. to about 160°F., from about 0.3 moles to about 2.5 moles of a high molecular weight olefin polymer, having an average molecular weight of at least about 600, with from about 0.5 to about 7.5 moles of acrylonitrile, and from about 0.4 to about 2.0 moles of a halogen, such as bromine and chlorine, in the presence of from about $7.8 \times 10^{-3}$ moles to about 0.02 moles of a catalyst, preferably such as iodine, suitably in the presence of a solvent or diluent, such as, for example, benzene, chlorobenzene, chloroform and the like; (b) reacting at a temperature of about 200°F. — 350°F. for about 1–6 hours, the product from the reaction (a) with sufficient amount of a primary aliphatic amine, preferably butylamine, to replace halogen atoms in the product from the reaction (a); then (c) reacting the resultant product from the reaction (b) with from about 0.2 moles to about 1.5 moles of maleic anhydride at a temperature of about 200°F. — 350°F. for a period of about 2–4 hours; and (d) reacting the product from the reaction (c), at a temperature of about 200°F. – 350°F. for a period of about 2–4 hours, with from about 0.2 hours, with from about 0.2 moles to about 1.5 moles of an aliphatic amine or polyamine containing at least one primary amino group per anhydride function on the reaction product obtained in reaction (c), and recovering the resultant product by well-known means.

The high molecular weight olefin polymer reactant is preferably a polymer of a lower mono-olefin, e.g., an olefin of about 2–6 atoms, having an average molecular weight of at least about 600, preferably from about 1,000 to about 100,000 or more. The sources of the olefin polymer reactant include polymers of 1-mono-olefins, such as ethylene, 1-butene, isobutene, as well as medial olefins such as 2-butene and the like. Particularly preferred are the polymers of propene, and butenes, or mixtures thereof, having average molecular weights in the range of from about 600 to about 3,000.

The amine reactants suitable for use in the reactions (b) and (d) of the process described above, are preferably aliphatic amines or polyamines of the general formula $H_2N(CH_2)_yNH_2$, wherein $y$ is an integer of about 3 to 10, said amine containing up to about 10 carbon atoms in the alkyl group, and poly-alkylene polyamines of the general formula

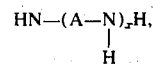

wherein A is a divalent alkylene radical of about 2 to about 6 carbon atoms, and $x$ is an integer of from 1 to about 10. Illustrative of suitable amines are, methylamine, dibutylamine, cyclohexylamine, ethylene diamine, trimethylene diamine, hexamethylene diamine, diethylene triamine, triethylene tetramine, tetraethylene pentamine, tripropylene tetramine, and also cyclic and higher homologs of such amines such as, for example, piperazine and amino-alkyl-substituted piperazines, e.g., 1-(2-aminopropyl)piperazine, 1-4-bis(2-aminoethyl)piperazine, 2-methyl-1-(2-aminobutyl)piperazine, bis NN' aminopropyl piperazine, and the like.

The chemical composition of the reaction product of this invention cannot be characterized with preciseness by chemical structural formula. While it is believed that the reaction produces predominantly certain polymer "imides", it is believed that minor amounts of other end products may also be formed. In view of the complex nature of the resultant reaction products, the precise composition of such product cannot be defined by its chemical structure, but rather must be defined by the method of preparation.

The reaction products of the herein-described invention are useful and effective additives for oleaginous lubricant compositions to impart desirable properties thereto when used in amounts of from about 0.1 to about 10%. Suitable lubricating oil bases include mineral oils, i.e., petroleum oils, shale oils, etc., synthetic lubricating oils, such as those obtained by the polymerization of hydrocarbons, and other well-known synthetic lubricating oils, and lubricating oils of vegetable and animal origin. Concentrates of suitable oil bases containing more than 10%, i.e., from about 10 to about 75%, or more, of the additive of the present invention, alone or in combination with other well-known additives, can be used for blending with lubricating oils in proportions desired for particular conditions or use, to give a finished product containing the effective amount of the additive of the present invention.

PREFERRED EMBODIMENT OF THE INVENTION

The following examples are illustrative of preferred embodiments of the present invention:

EXAMPLE I

Part (a)

1320 grams (equivalent to 0.5 moles olefin content) of a polybutene, having an average molecular weight of about 2,000 was dissolved in 950 ccs. of chlorobenzene. To the solution was added 80 ccs. of acrylonitrile (about 2 moles) and 5 grams of iodine as catalyst. The solution was covered from light, and chilled to 60°–70°F., and maintained at this temperature. Chlorine gas was introduced at the rate of No. 4 Rotameter readings per hour for three hours (equivalent to an excess of about one mole). After the chlorine addition, the reaction mixture was stirred for one hour and worked up. 2436 grams of diluted product with an activity of 65% was recovered.

Part (b)

To one-third of the product recovered in Part (a) was added dropwise 7.5 grams (a slight excess of 0.1 mole) of butylamine. After stirring for one hour, the solution was refluxed for two hours.

Part (c)

To the reaction in Part (b) was added 13 grams (about 0.14 moles) of maleic anhydride and refluxing of the reaction mixture continued for two hours. A slight amount of the excess maleic anhydride was sublimed out.

Part (d)

To the reaction mixture obtained in Part (c) was added 10 grams (equivalent to about 0.5 mole) of tetraethylenepentamine, and the mixture refluxed for two hours. Seven grams of calcium hydroxide was added to remove all the halides in solution, the product filtered hot and then stripped of the solvent. The recovered product contained 0.465% nitrogen and was 49% active.

EXAMPLE II

The product in this Example was prepared essentially as the product of Example I, above, except that in Part (d) of the example, N,N'- Bisaminopropyl piperazine was used in place of the tetraethylenepentamine used in Example I, above. The recovered product contained 0.4% nitrogen.

The effectiveness of the reaction products of the present invention as lubricant additive is demonstrated by the data in Table I below. These data were obtained by the so-called Spot Dispersancy Test (SDT), which is a measure of the dispersancy property of the additive, and the so-called Hot Tube Test (HTT) for evaluating the thermal stability and oxidation resistance of the additive.

In the Spot Dispersancy Test, a measured amount of the additive to be tested is mixed with a measured volume of crankcase lubricating oil formulation which has been used in a Lincoln Sequence V engine test for 394 hours (twice the time of the standard test time). This composition is heated and stirred at about 300°F. for about 16 hours and an aliquot is transferred to blotting paper. A control is made at the same time by stirring and heating at 300°F. for 16 hours a second oil from the 394 hour Lincoln Sequence engine test, and depositing an aliquot on blotting paper. At the same time, a readily available commercial ashless dispersant is mixed in the same manner as above, for comparison purposes. The deposits on the blotting paper are measured to obtain the average diameter of the outer oil ring (Do), and the average diameter of the inner sludge ring (Da). The ratio of Da/Do is an indication of the detergent-dispersant property of the addition agent.

The Hot Tube Test is used to evaluate the high temperature detergency value of oils used in diesel applications. In this test the oil is passed through a 16 inch, 8mm ID, glass tube, six inches of which is heated to a top temperature of 495°F. by means of heat transfer from an aluminum block. The block is heated at one end and causes a temperature gradient along the length of the glass tube, similar to the temperature gradient along an engine piston. Oil is passed through the glass tube at the rate of 0.1 cc per minute, along with air being introduced at the rate of 20 ccs. per minute. At the end of the 100 minute test period, the glass tube is removed, cooled, and washed with hexane. Lacquer in the five inches of the glass tube which was in the heated aluminum block is rated by color on a scale of 1 to 10, the former value indicating a clean tube, and the latter value indicating a black tube. Lacquer formed in the glass tube below the heated block is rated by letter, A being none or very little, very light amber lacquer, B being up to one inch of light amber lacquer, etc. The final rating of that portion of the tube in the heated block is a weighted average, of the various ratings present, based on the variation of lacquer along the length of the tube (as opposed to area coverage).

The following oil compositions were used in making the above tests and were as follows:

| Components | Sample A | Sample B |
|---|---|---|
| Over-based Magnesium Sulfonate | 2.0% | 2.0% |
| Zinc Dialkyl* Dithiophosphate | 1.1% | 1.1% |
| Pour Point Depressor | 0.5% | 0.5% |
| Solvent-extracted SAE 5 Oil | 21.7% | 21.7% |
| Solvent-extracted SAE 10 Oil | 70.2% | 70.2% |
| Product of Example I | 4.5% | — |
| Product of Example II | — | 4.5% |

*From mixture of isopropyl and decyl alcohols

TABLE I

| SAMPLE | TYPE OF TEST | |
|---|---|---|
| | SDT* | HTT** |
| A | 87.5 | 8.8A |
| B | 84 | 7.3B |

Rating:
*90, Excellent; 85, very good; 80, Pass
**10A, Perfect

The data in the above Table I demonstrate the effectiveness of the products of the present invention as detergent-dispersant additives in lubricating oils for use in automobile and diesel engines.

Percentages given herein and in the appended claims are weight percentages unless otherwise stated.

Although the present invention has been described with reference to certain specific preferred embodiments thereof, the invention is not limited thereto, but includes within its scope such modifications and variations as come within the scope and spirit of the appended claims.

I claim:

1. The oil-soluble product prepared by the process comprising (a) reacting from about 0.3 moles to about 2.5 moles of a high molecular weight olefin polymer having an average molecular weight of at least 600, with from about 0.5 moles to about 7.5 moles of acrylonitrile, and from about 0.4 to about 2.0 moles of chlorine or bromine at a temperature of from about 60°F. to about 160°F.; (b) reacting, at a temperature of from about 200°F. to about 350°F. for a period of about 1 to 6 hours, the product of (a) with sufficient amount of a primary aliphatic amine to replace the halogen atoms in the product of reaction (a); (c) reacting the product of (b) with from about 0.2 moles to about 1.5 moles of maleic anhydride at a temperature of from about 200°F. to about 350°F. for a period of about 2-4 hours; and (d) reacting at a temperature of from about 200°F. to about 350°F., the product of reaction (c) with from about 0.2 moles to about 1.5 moles of an aliphatic amine or polyamine containing at least one primary amino group per anhydride function on the reaction product of (c), and recovering the reaction product of (d).

2. The oil-soluble product prepared by the process of claim 1, wherein the reaction of (a) is carried out in the presence of catalytic amounts of iodine in the absence of light.

3. The oil-soluble product prepared by the process of claim 1, wherein the olefin polymer is a polybutene.

4. The oil-soluble product prepared by the process of claim 1, wherein the olefin polymer is a polypropene.

5. The oil-soluble product prepared by the process of claim 1, wherein the primary aliphatic amine in reaction step (b) is butylamine.

6. The oil-soluble product prepared by the process of claim 1, wherein the aliphatic polyamine employed in step (d) of said process is selected from the group consisting of a polyamine of the general formula $H_2N(CH_2)_yNH_2$, wherein $y$ is an integer of from about 3 to about 10, and a polyalkylene polyamine of the general formula

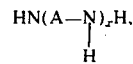

wherein A is a divalent alkylene radical of from about 2 to about 6 carbon atoms, and $x$ is an integer of from 1 to about 10.

7. The oil-soluble product prepared by the process of claim 6, wherein the amine is tetraethylenepentamine.

8. The oil-soluble product prepared by the process of claim 6, wherein the amine is N,N'-Bisaminopropyl piperazine.

* * * * *